Patented Dec. 4, 1951

2,577,279

UNITED STATES PATENT OFFICE 2,577,279

FOAMED ALKYD-ISOCYANATE PLASTICS

Eli Simon, Los Angeles, and Frank W. Thomas, Burbank, Calif., assignors to Lockheed Aircraft Corporation, Burbank, Calif.

No Drawing. Application June 25, 1948, Serial No. 35,294

3 Claims. (Cl. 260—2.5)

This invention relates to cellular or porous materials and relates more particularly to foamed plastics and methods of producing the same.

Various methods have been employed to produce cellular or foamed rubbers and plastics, but such prior procedures have been exceedingly complicated and usually require the employment of extensive equipment. For example, foamed rubber is sometimes produced by the solution of a gas in an undercured rubber which is held under high pressure with the slow controlled release of the pressure while subjecting the rubber to relatively high temperature so that the rubber is vulcanized and foamed simultaneously. Similarly, other plastics have been made cellular by the incorporation therein of foaming agents and then subjecting the plastic to heat and pressure with the controlled release of the pressure or by the solvent solution of thermoplastic resins under applied heat and pressure followed by the controlled release of pressure and cooling. In other methods, air is dispersed in a viscous emulsion of an undercured thermosetting resin and the resin is then slowly block-polymerized. None of the previous methods are adapted to the direct introduction and foaming of the material in a cavity so as to polymerize in the cavity and bond with its walls. The previously employed methods usually require special equipment and can only produce sheets, slabs, blocks or other given shapes of the foamed material. Such conventionally foamed material must subsequently be cut and shaped to adapt it for specific uses and then must be secured in place by adhesives, etc. In other words, the previously shaped material cannot be installed in cavities of peculiar or special contours in a manner to bond directly with the walls of the cavity. Furthermore, the cutting or shaping of the previously foamed materials and the subsequent attachment of the shaped parts to the surrounding structure is expensive and time consuming and does not permit the development or full utilization of the structural strength of the foamed material, the latter usually being nothing more than a light weight filler which does not add to the structural strength of the assembly.

The present invention is concerned with the production of foamed plastics by the controlled reaction of poly-isocyanates and alkyd resins.

Isocyanates are reactive molecules which form addition products with labile or active hydrogen atoms. As an illustration, an isocyanate, such as R—N=C=O, where R represents an alkyl or aryl group, reacts with an alcohol, such as ethyl alcohol, to form a urethane as an addition product. Thus:

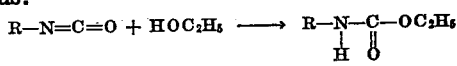

(An isocyanate) (Ethyl alcohol)    (A urethane)

When a di-isocyanate is used, a bi-functional molecule is available which can serve as a polymerizing agent when reacted with another molecule containing more than one functional group, each group having at least one active or labile hydrogen atom. Thus:

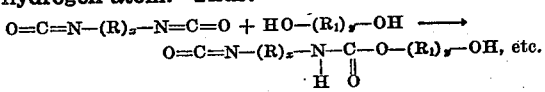

where $(R)_x$ and $(R)_y$ represent intervening structure between the terminal functional groups.

The above reaction will theoretically produce a large molecule that is always thermoplastic or heat sensitive because the polymer is predominantly linear and although there may be some branching, the molecule still remains a single macro-molecule isolated from surrounding molecules as far as chemical covalent bonds are concerned so that its motion is not limited nor its position with relationship to other molecules fixed. A more rigid and less heat-sensitive resin can be formed if some molecules are introduced having more than two functional groups, each group containing at least one reactive hydrogen atom. Thus if an alkyd type resin is formed by reacting glycerol which is tri-functional with adipic acid which is bi-functional to a stage corresponding roughly to a "B" stage resin the resultant syrupy resin can quickly be taken to the final stage of resinification where it is rigid, insoluble and less heat sensitive, by reacting it with a di-isocyanate, such as toluene di-isocyanate through a process of polymerization or addition reaction, the labile hydrogen atoms of the free OH groups of the alkyd resin molecule adding to the isocyanate molecule producing a cross linked three dimensional molecule. Molecules of three dimensional extension have restricted and finally arrested motion. Thus gel formation in polymerization does not necessarily depend upon the production of giant molecules but may occur if there is a sufficiently high concentration of cross-linked three dimensional molecules having only a comparatively low degree of polymerization.

It is an object of the invention to provide a simple, commercially practical method for producing light weight cellular or foamed plastic material which does not necessitate the employment of special equipment and which permits the direct application or introduction of the material to the parts or cavity to immediately bond with the surfaces thereof. In accordance with the method of this invention the plastic and the foaming agent or agents are simply mixed together and poured into the cavity or otherwise applied to the parts to directly bond with the surfaces thereof and to assume a cellular or foamed condition. No pressure applying or pressure regulating apparatus is required and in most cases it is unnecessary to apply heat, the inherent reactions of the constituents liberating gas for the internal cells and serving to cure the resin.

Another object of the invention is to provide a method of producing foamed or cellular plastics characterized by the employment of water as the foaming agent and by the manner in which the water is incorporated in the resin-poly-isocyanate mixture to produce a superior low density cellular plastic. Assuming the water content, alkyd resin type and concentration and the di-isocyanate type and concentration to be the same, the manners of incorporating the water contemplated by the invention results in the production of a foamed plastic product of much lower density than is obtainable by the simple addition of the water to the alkyd resin and di-isocyanate mixture. We have discovered that a superior low density foamed plastic product is obtained by incorporating the foaming-component water through the use of a metallic salt hydrate that is soluble in anhydrous ethyl alcohol at approximately 18° C. to the extent of at least 1½ grams of the salt to 100 cc. of the solvent or by the employment of a combination of a non-ionic wetting agent and the water in an appropriate concentration. The metallic salt is believed to concentrate at the interfaces of the globular liquid-gas surfaces to increase the viscosity of the film and thus stabilize the cells or foam and is also believed to serve as a dispersing agent between the water and the resin so that the reaction is initiated at a multitude of points when the ingredients are mixed. Similarly the non-ionic wetting agent is believed to lower the interfacial surface tension so that the great increase in surface which accompanies the foam formation is more readily accomplished and the wetting agent also causes the reaction to be initiated at a multitude of points by serving as a dispersing agent between the water, alkyd resin and di-isocyanate. While these phenomena are thought to account for the greatly increased volume of the foamed plastic there may well be other actions and effects attending the employment of the metallic salt hydrate or the non-ionic wetting agent.

Another object is to provide a foamed plastic method and composition characterized by the employment of a mixture of a low acid number resin and a resin having an intermediate acid number, the resin of the intermediate acid number functioning as a foaming agent component and reaction controller, and contributing to the desirable physical characteristics of the composite cellular plastic. The reaction rate or foaming is effectively controlled and a foamed plastic of superior physical properties is obtained by employing as the alkyd resin component a mixture of a resin having an acid number of from 5 to 20 (to be hereinafter referred to as the No. 1 resin) and a resin having an acid number of from 25 to 60 (the No. 2 resin).

The invention comprehends generally the mixing of a specially prepared alkyd resin or alkyd resins with a di-isocyanate and with the addition of a small percentage of either a metallic salt hydrate that is soluble in anhydrous ethyl alcohol or a combination of a non-ionic wetting agent and water and the pouring or application of this mixture to react at atmospheric pressure with or without the application of external heat and with or without a post-curing at somewhat elevated temperatures.

The resin or resins which we prefer to employ in the formulations are alkyd resins, namely the reaction products of polyhydric alcohols and dibasic acids and are characterized by a relatively low water content and a low acid number and/or what we will term an intermediate acid number. The resin employed may be the reaction product of glycerol, adipic acid, and phthalic anhydride. Such ingredients of the resin are reacted in an open vessel to have an acid number of from 5 to 20. The following is a typical formula for preparing an alkyd resin suitable for incorporation in the foamed plastics and adapted to be prepared as just described to have a water content of from 0.1% to 1.5% by weight and an acid number of from 5 to 20.

Formula A

| | Mols |
|---|---|
| Glycerol | 4 |
| Adipic acid | 2.5 |
| Phthalic anhydride | ½ |

In practice from 3 to 5 mols of glycerol, from 1.5 to 3 mols of adipic acid and from 0.0 to 1.5 mols of phthalic anhydride may be used in compounding the resin. This alkyd resin is mixed with the di-isocyanate and with either an alcohol soluble metallic salt hydrate or a solution of a non-ionic wetting agent in water as the foaming agent component, the reaction being controlled by the percentage of the foaming agent component employed and by the overall mass or size of the batch to produce a strong light-weight product having discrete or non-communicating cells.

The foam producing reaction may be made to proceed at a controlled and desirable rate to yield a low weight structurally strong cellular plastic by employing as the alkyd resin component a mixture of the low acid number alkyd resin and an alkyd resin having an intermediate acid number. The intermediate or higher number acid resin aids in providing the foam producing gas, namely carbon dioxide, through the reaction of the iso-cyanate radical with free carboxylic groups. Thus the reaction of an isocyanate R—N=C=O with an organic carboxylic acid

yields

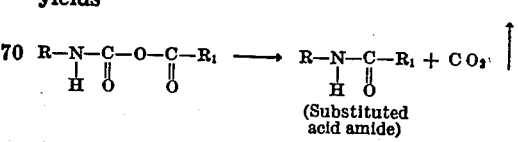

where R and R₁ may be either alkyl or aryl groups. The high acid number resin (No. 2 resin)

of the mixture functions both as a foaming agent component and a reaction controller contributing materially to the physical characteristics of the cellular plastic. The two resins of the mixture are preferably compounded from glycerol, adipic acid and phthalic anhydride in the proportions and ranges of proportions set forth above and the low acid number resin (No. 1 resin) may have an acid number of from 5 to 20 while the resin (No. 2 resin) of the intermediate acid number may have an acid number of from 25 to 60. The water content of both resins may be from 0.1 to 1.5% by weight and where the two resins are employed from 15 to 85% of the low acid number resin (No. 1 resin) is used.

The isocyanate reacted with the alkyd resin or resins is a poly-isocyanate such as meta-toluene di-isocyanate. The di-isocyanate is used in the proportion of approximately 35 to approximately 150 parts by weight to 100 parts by weight of the alkyd resin or resins, depending upon the total quantity of water present which includes the water in the resin component and that added in combination with the carriers to be described below. Some of the reactions between an isocyanate and water may be represented by the following, in which R may be either an alkyl or aryl group.

1

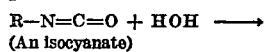
(An isocyanate)

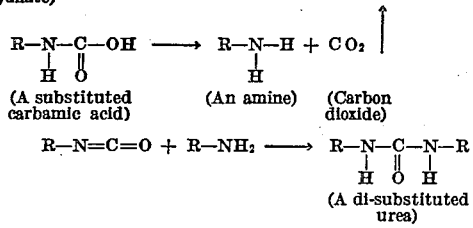

2

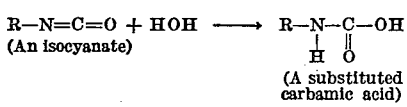
(An isocyanate)

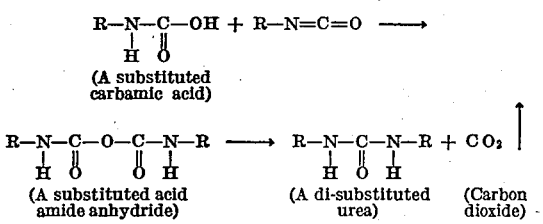

We have found that excellent results are obtained and a strong low density cellular plastic or foamed plastic is produced by incorporating the water in combination with a non-ionic wetting agent. The concentration of the wetting agent in the water may range from 5 to 75% by weight. The following are examples of non-ionic wetting agents that are effective in obtaining good distributed foam producing reaction:

1. Alkylated phenoxy polyethoxy ethanol of the type structure:

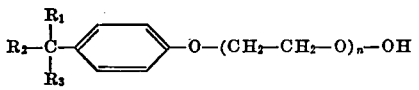

where $R_1$, $R_2$ and $R_3$ may be either H or $CH_3$ or $C_2H_5$ radicals and $n$ may vary from 2 through 6.

2. Polyoxy alkylene derivatives of hexitol anhydride partial long chain fatty acid esters of the type structure:

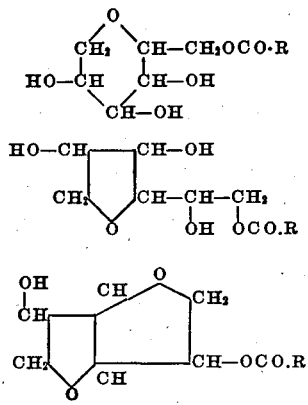

where R=the residue of a long chain fatty acid, and in which the free hydroxyls have been modified by reaction with alkylene oxide to give poly alkoxy alcohol derivatives.

3. Water-soluble hydroxylated resins, illustrated by polyvinyl alcohol which has the type structure:

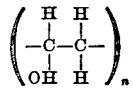

where $n$ may vary from 35 to 300.

We have also discovered that highly satisfactory results are obtained and a strong low density foamed plastic is produced by incorporating water in the formulation through the use of a metallic salt hydrate characterized by the fact that it is soluble in anhydrous ethyl alcohol at approximately 18° C. to the extent of at least 1½ grams of the salt to 100 c. c. of the solvent. The metallic salt hydrates that have been found to be practical and effective as carriers for the foam producing water component of the resin are:

Sodium acetate, $NaC_2H_3O_2 \cdot 3H_2O$
Manganous chloride, $MnCl_2 \cdot 4H_2O$
Cupric nitrate, $Cu(NO_3)_2 \cdot 6H_2O$
Magnesium bromide, $MgBr_2 \cdot 6H_2O$
Lithium salicylate, $C_6H_4OHCOOLi \cdot \tfrac{1}{2}H_2O$
Calcium chloride, $CaCl_2 \cdot 6H_2O$ The results obtained by employing either the non-ionic wetting agent or the metallic salt hydrate as the carrier and/or dispersant for the water component of the formulation are far superior to results obtainable by merely adding water to the resin and polyisocyanate. For example, when a 50% aqueous solution of an alkylated phenoxy polyethoxy ethanol of the type formula:

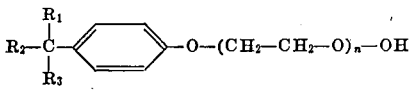

(corresponding to 0.507 gram of water) is added to 30 grams of the alkyd resin of Formula A containing 0.32% water and having an acid number of 14, and 20 grams of toluene di-isocyanate, a body of foamed plastic having a volume of 12 cubic inches is obtained. By contrast, when 0.507 gram of water is merely added to a mixture of 30 grams of the same resin and 20 grams of toluene di-isocyanate, the body of foamed plastic having a volume of only 8½ cubic inches is obtained.

The introduction of the non-ionic wetting agent with the water component apparently acts to lower the interfacial surface tension so that the great increase in surface which accompanies the foam formation resulting from the reaction of the di-isocyanate and the water is more readily accomplished, and the wetting agent also causes the reaction to be initiated at a multitude of points by acting as a dispersing agent between the water, the alkyd resin and the di-isocyanate so that a low density foamed product having a multiplicity of substantially uniformly distributed cells is obtained. The employment of the selected non-ionic wetting agent may of course have other desirable results. Similarly the addition of 1.4 grams of hydrated manganous chloride, which is equivalent to 0.507 gram of water, to 30 grams of the alkyd resin of formula A and 20 grams of the toluene di-isocyanate results in a foamed plastic body having a volume of 10 cubic inches.

The alcohol soluble metallic salt hydrate employed in the formulation in the range proportion herein set forth apparently concentrates at the interface of the globular liquid-gas surface and increases the viscosity of the film serving to stabilize the foam or cell. The metallic salt hydrate also apparently acts as a dispersing agent between the water and an alkyd resin so that upon mixing in the di-isocyanate the foam producing reaction is initiated at multitudinous points to produce a more uniformly distributed film. The hydrated metallic salt may, of course, have other and different desirable actions in increasing the volume of the foamed plastic.

Where the non-ionic wetting agent is employed, it is used in an aqueous solution which in turn is added to or mixed with the resin component to impart an added water content of from 0.1 gram to 5 grams for each 100 grams of the resin. The wetting agent is preferably employed in a 5 to 75% by weight aqueous solution. Where the alcohol soluble metallic salt hydrate or hydrates are used they are preferably added to the resin component as pure hydrates. The hydrate or hydrates are mixed with the resin to give the resin component an added water content of from 0.1 gram to 5 grams for each 100 grams of the resin.

The following are typical examples of the formulations of the invention, it being understood that appropriate variations in the proportions may be resorted to in compounding batches of different volumes and where the materials are to be poured or applied under different conditions.

Example 1

| | Grams |
|---|---|
| Alkyd resin of Formula A having an acid number of 14 and a water content of 0.32% by weight | 30 |
| Meta-toluene di-isocyanate | 20 |
| 50% by weight aqueous solution of an alkylated phenoxy polyethoxy ethanol of the type structure: | |

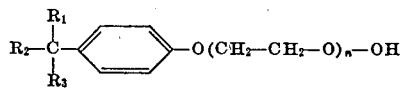

where $R_1$, $R_2$ and $R_3$ are either H or $CH_3$ or $C_2H_5$ radicals and $n$ may vary from 2 through 6 _____ 1.014

Example 2

| | Grams |
|---|---|
| Alkyd resin of Formula A having an acid number of 14 and a water content of 0.32% by weight | 5 |
| Alkyd resin of Formula A having an acid number of 44 and a water content of 0.63% by weight | 25 |
| Meta-toluene di-isocyanate | 20 |
| 50% by weight aqueous solution of an alkylated phenoxy polyethoxy ethanol of the type of structure: | |

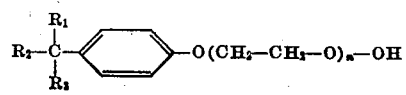

where $R_1$, $R_2$ and $R_3$ are either H or $CH_3$ or $C_2H_5$ radicals and $n$ may vary from 2 through 6 _____ 1.014

Example 3

| | Grams |
|---|---|
| Alkyd resin of Formula A having an acid number of 14 and a water content of 0.32% by weight | 30 |
| Meta-toluene di-isocyanate | 20 |
| Hydrated manganous chloride ($MnCl_2 \cdot 4H_2O$) | 1.40 |

Example 4

| | Grams |
|---|---|
| Alkyd resin of Formula A having an acid number of 14 and a water content of 0.32% by weight | 30 |
| Meta-toluene di-isocyanate | 25 |
| 50% by weight aqueous solution of an alkylated phenoxy polyethoxy ethanol of the type structure: | |

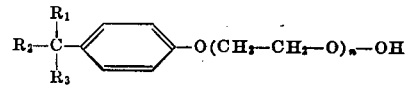

where $R_1$, $R_2$ and $R_3$ are either H or $CH_3$ or $C_2H_5$ radicals and $n$ may vary from 2 through 6 _____ 1.61

Example 5

| | Grams |
|---|---|
| Alkyd resin of Formula A having an acid number of 14 and a water content of 0.32% by weight | 30 |
| Meta-toluene di-isocyanate | 15 |
| Manganous chloride hydrate ($MnCl_2 \cdot 4H_2O$) | 1.61 |

Example 6

| | Grams |
|---|---|
| Alkyd resin of Formula A having an acid number of 14 and a water content of 0.32% by weight | 30 |
| Meta-toluene di-isocyanate | 20 |
| 10% by weight aqueous solution of a polyvinyl alcohol resin of the type structure: | |

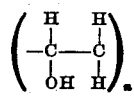

where $n$ may vary from 35 to 300 _____ 0.564

The alkyd resins of the foregoing examples may be prepared as above described and are the reaction products of the above named polyhydric alcohol and di-basic acids.

In preparing the cellular or foamed plastic material of the invention the alkyd resin or resins formulated and prepared as previously described are thoroughly mixed with the foaming agent component and the meta toluene di-isocyanate or other di-isocyanate in the ratio calculated to produce a cellular plastic having the intended density and physical properties. The mixture is then poured into the mold or into a cavity in the structure and is allowed to react either with or without the application of external heat or attended by moderate heating of, say, between 100° F. and 150° F. depending upon the size of the mold or cavity. The alkyd resin-di-isocyanate reaction is simply allowed to go on to completion and produces a cellular plastic in which the individual cells are discrete. A postcuring operation of from 10 to 20 hours at a temperature of from 125° F. to 180° F. is desirable to continue the polymerization reaction and thus produce a more heat stable and more solvent resistant cellular resin. It is to be noted that no special pressure applying or pressure regulating equipment is required for the operation and that only simple mixing and heating techniques are used. The material has excellent adhesion to the various metals, woods, etc. and closely conforms with the contours of even very complex spaces or cavities and is therefore adapted for use in situations where preformed or pre-cut material are not practical.

It should be understood that the invention is not based upon or dependent upon the theories which we have expressed. Nor is the invention to be regarded as limited to the express procedure or materials set forth, these details being given only by way of illustration and to aid in clarifying the invention.

We do not regard such specific details as essential to the invention except insofar as they are expressed by way of limitation in the following claims in which it is our intention to claim all novelty inherent in the invention as broadly as is permissible in view of the prior art.

We claim:

1. The method of making cellular plastic material which comprises providing an alkyd resin having a water content of not more than 1.5% by weight, namely the reaction product of glycerol, adipic acid and phthalic anhydride, adding a sufficient quantity of a metallic salt hydrate that is soluble in anhydrous ethyl alcohol at approximately 18° C. to the extent of at least 1½ grams of the salt to 100 c. c. of the ethyl alcohol to the resin to increase the water content by from 0.1 to 5.0 grams of water for each 100 grams of the resin, mixing meta toluene di-isocyanate and the resin-salt hydrate mixture in the proportion of from approximately 35 to approximately 150 parts by weight of the meta toluene di-isocyanate to 100 parts by weight of the resin, and allowing the resultant mixture to react.

2. The method of making cellular material which comprises providing an alkyd resin, namely the reaction product of from 3 to 5 mols glycerol, from 1.5 to 3 mols adipic acid, and not more than 1.5 mols phthalic anhydride dried to have a water content of from 0.1% to 1.5% by weight, adding a sufficient quantity of a metallic salt hydrate chosen from the group consisting of sodium acetate, manganous chloride, lithium salicylate, calcium chloride, cupric nitrate and magnesium bromide to increase the water content by from 0.1 to 5.0 grams per 100 grams of the resin, mixing meta toluene di-isocyanate with the resin and salt mixture in the proportion of from approximately 35 to approximately 150 parts by weight of the meta toluene di-isocyanate to 100 parts of the resin, and allowing the resultant mixture to react.

3. The method of making cellular material which comprises providing an alkyd resin, namely the reaction product of from 3 to 5 mols glycerol, from 1.5 to 3 mols adipic acid, and not more than 1.5 mols phthalic anhydride reacted to have an acid number of from 5 to 20 and dried to have a water content of from 0.1% to 1.5% by weight, adding a sufficient quantity of a metallic salt hydrate chosen from the group consisting of sodium acetate, manganous chloride, lithium salicylate, calcium chloride, cupric nitrate and magnesium bromide to increase the water content from 0.1 to 5.0 grams per 100 grams of the resin, mixing meta toluene di-isocyanate with the resin and salt mixture in the proportion of from approximately 35 to approximately 150 parts by weight of the meta toluene di-isocyanate to 100 parts of the resin, and allowing the resultant mixture to react.

ELI SIMON.
FRANK W. THOMAS.

REFERENCES CITED

The following references are of record in the file of this patent:

UNITED STATES PATENTS

| Number | Name | Date |
| --- | --- | --- |
| 2,132,969 | Rau | Oct. 11, 1938 |
| 2,444,869 | Clayton et al. | July 6, 1948 |
| 2,446,429 | Nelson et al. | Aug. 3, 1948 |
| 2,452,416 | Wright | Oct. 26, 1948 |

OTHER REFERENCES

De Bell et al.: "German Plastics Practice," pages 300, 301, 310–316, 463–465, pub. by De Bell and Richardson, Springfield, Mass., 1946.